United States Patent Office 3,375,422
Patented Mar. 26, 1968

3,375,422
HALL EFFECT D.C. MOTOR
Alexandre Boudigues, Paris, France, assignor to CSF—
Compagnie Generale de Telegraphie Sans Fil, a corporation of France
Filed Dec. 22, 1964, Ser. No. 420,420
Claims priority, application France, Dec. 23, 1963, 958,145
5 Claims. (Cl. 318—138)

ABSTRACT OF THE DISCLOSURE

A D.C. motor with a constant torque comprising a first rotor and a first stator provided with two Hall probes perpendicular to each other for providing output voltages respectively proportional to the sine and the cosine of the angular position of the first rotor and a second rotor and a second stator provided with two windings perpendicular to each other. A constant angular shift is maintained between the first and the second rotor and the windings of the second stator are respectively fed with the voltages supplied by the Hall probes.

---

Figure 1:
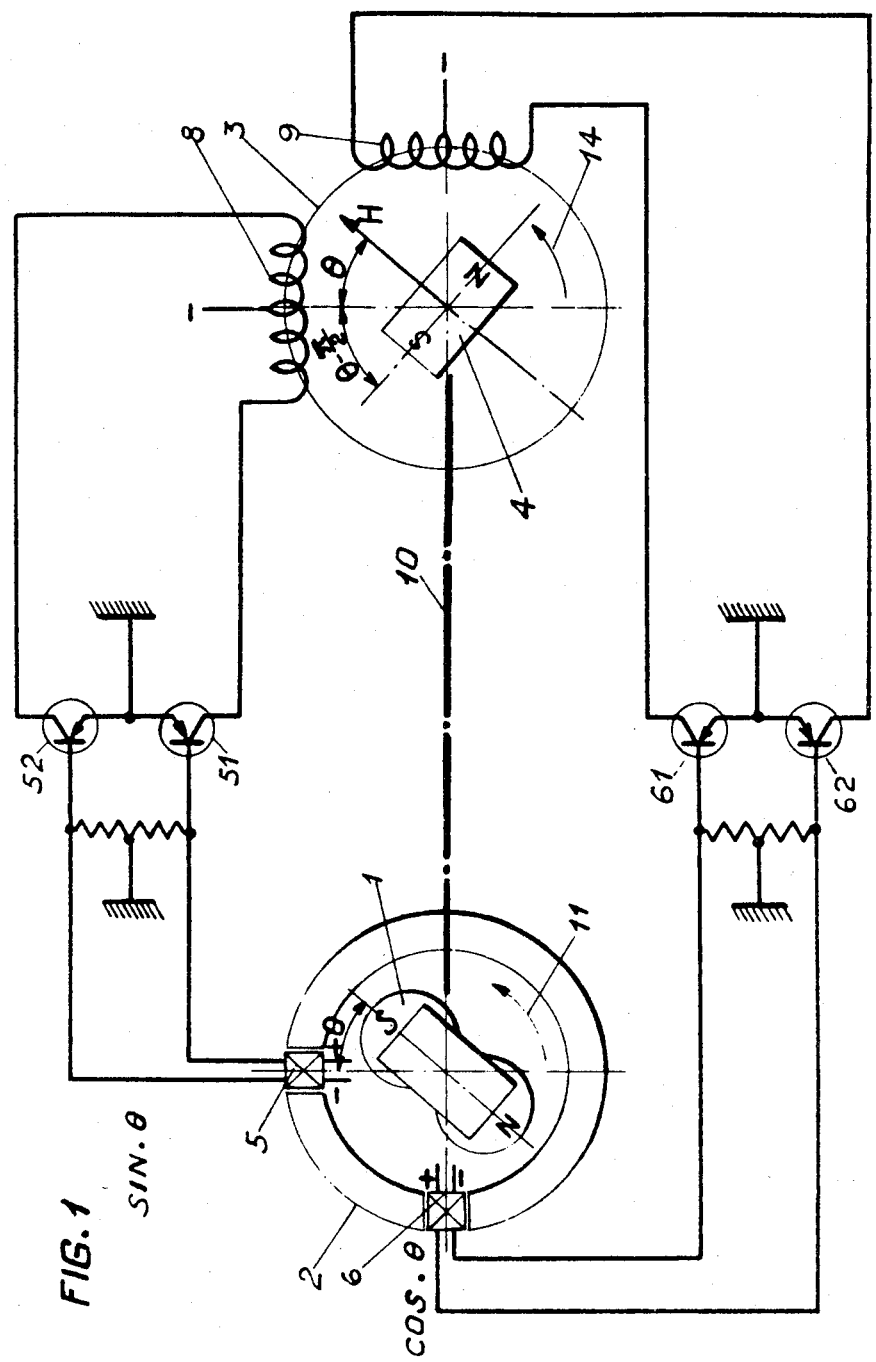

The present invention relates to D.C. electric motors of the type using the Hall effect.

Conventional D.C. motors generally include a fixed field electromagnet and a rotor winding, both receiving, for example in series, D.C. current from a D.C. source.

The rotor winding has to be fed through a commutator, rotating under brushes. As is well known, commutators have the important defect of causing sparking between contacts, especially at the instants a commutator segment engages or leaves the brush.

This defect is particularly damaging when the motor has to be subjected to very low barometric pressure in use, which enhances sparking and consequently increases random voltage drops at the supply terminals. This, in turn, is liable to cause motor speed and torque variations.

This is for example the case with the many electric motors used in the electro-mechanical equipment of certain missiles, which are required to fly at variable and sometimes very high altitudes, without protection against pressure variations.

It is an object of the invention to provide a motor free of this drawback.

According to the invention there is provided a direct current motor comprising a first rotating magnet driven by a second rotating magnet, the driven magnet being the rotor of one Hall effect resolver, having a stator with two Hall probes providing at their outputs voltages respectively proportional to the sine and cosine of the angular positions of said rotor, the driver magnet rotating inside a second stator, having two coils perpendicular to each other, and connected to the outputs of said two Hall probes respectively, means being provided for maintaining a constant angle between the respective magnetic moments of said two magnets.

Figure 2:
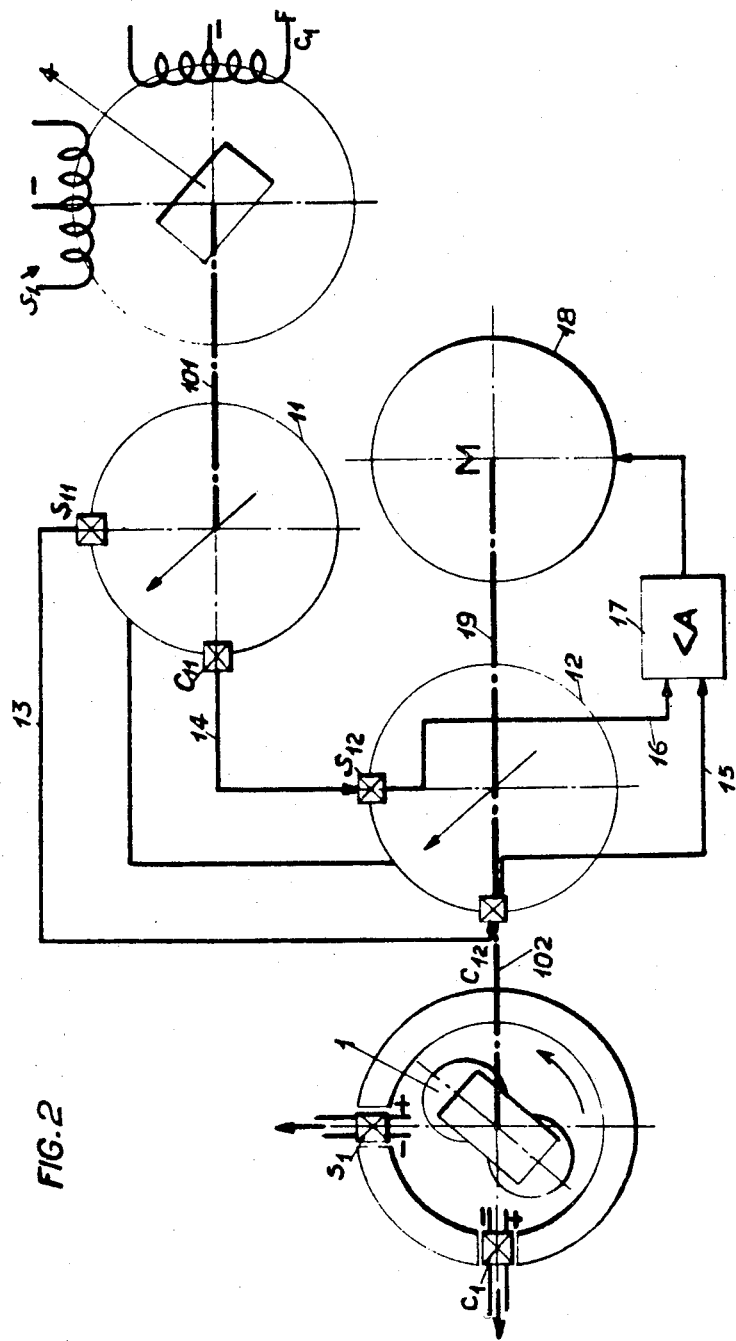
Figure 3:
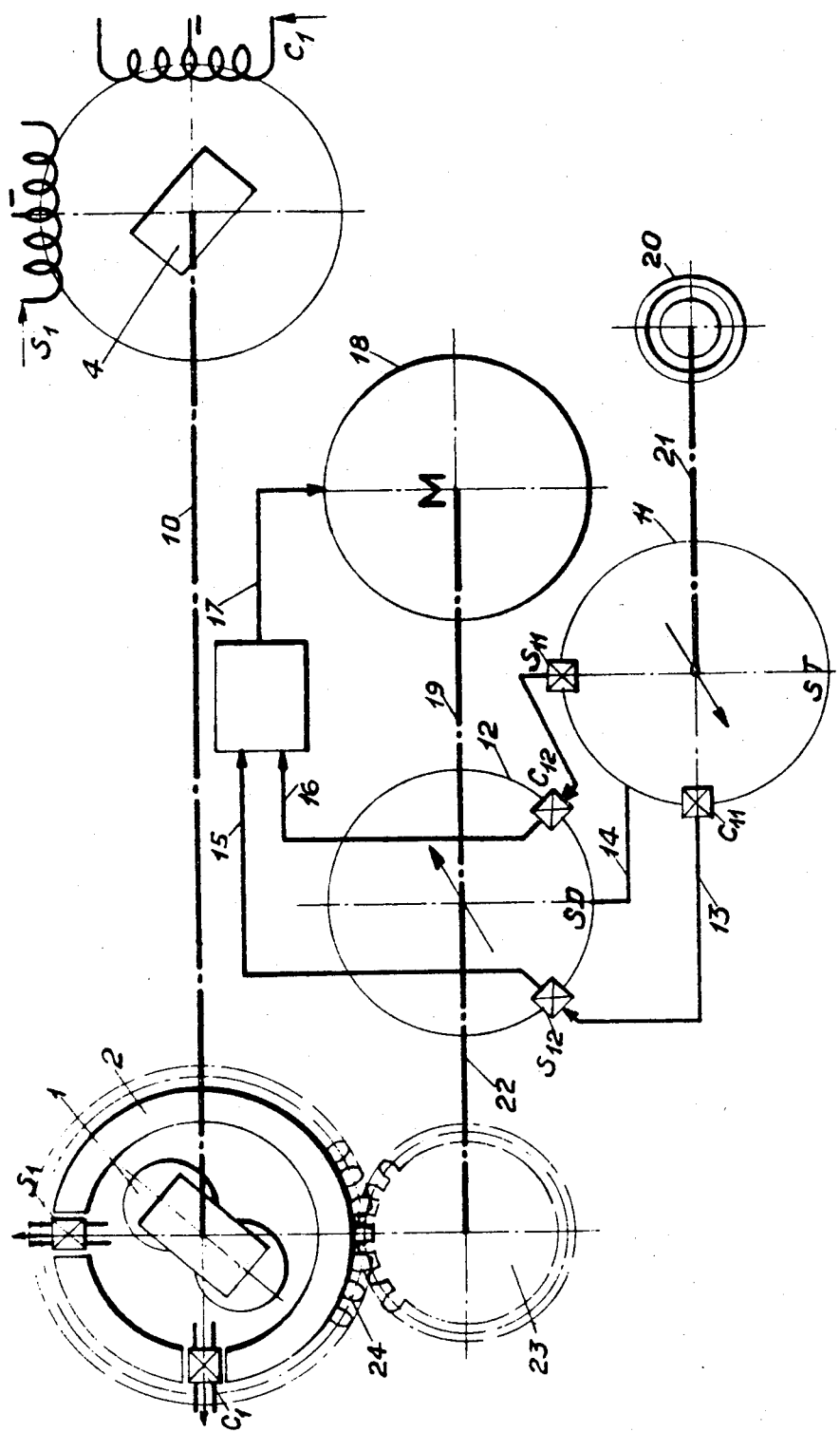

For a better understanding of the invention and to show how the same may be carried into effect, reference will be made to the drawing accompanying the following description and wherein:

FIG. 1 shows very diagrammatically the electrical circuit of a Hall effect motor according to the invention; and FIGS. 2 and 3 show modifications.

The motor according to the invention shown in FIG. 1 comprises a Hall effect resolver. The resolver comprises a permanent magnet rotor 1 which rotates inside a stator 2, provided with two Hall probes 5 and 6, placed in two slots at right angles.

The control electrodes of the probes 5 and 6 are connected to a D.C. source. Their output electrodes are respectively connected to the windings 8 and 9, of a stator 3. Windings 8 and 9 are at right angles with respect to each other.

Rotor 4, mounted for rotation within stator 3, is a permanent magnet, mechanically coupled to rotors; for example both rotors are carried by one shaft 10, so that their respective magnetic moments make a constant angle $\alpha$, equal for example to $\pi/2$.

Magnet 1 is provided with North and South pole-pieces, in order to obtain a sinusoidal voltage at the probes 5 and 6.

The electrodes of probe 5 are connected to the two ends of winding 8, and those of probe 6 are connected to winding 9.

The voltages provided by probes 5 and 6 are respectively amplified in balanced transistorized amplifiers 51–52 and 61–62.

Calling $\theta$ the angle between the North-South direction of magnet 1 and probe 5, the latter will supply a voltage proportional to $\sin \theta$, whereas probe 6 will supply a voltage proportional to $\cos \theta$.

The resultant field H generated by windings 8 and 9 then makes an angle $\theta$ with the axis of winding 9 which receives the voltage proportional to $\cos \theta$ and, consequently, an angle $$\frac{\pi}{2} - \theta$$

with the axis of windings 8.

In the case shown in FIG. 1, the moment $\vec{M}$ of magnet 4 is normal to the field $\vec{H}$ ($\alpha = \pi/2$, $\sin \alpha = 1$); consequently the starting torque is a maximum, its value being the product $\vec{M} \times \vec{H}$.

With motor 4 rotating in the direction of arrow 14, rotor 1 rotates simultaneously in the direction of arrow 11, at the same speed as rotor 4. When rotor 1 rotates, angle $\theta$ varies; since windings 8 and 9 carry currents whose respective values are in ratio $\tan \theta$, the resulting field rotates at the speed $d\theta/dt$ in the direction of arrow 14.

Rotation of field H in turn causes rotation of magnet 4 under the action of a torque equal to the starting torque $C_0$ reduced, by friction, and delayed by the currents induced in windings 8 and 9 by rotation of magnet 4.

However, it can be seen that the torque with the motor on load remains substantially proportional to $\vec{M} \cdot \vec{H}$, and accordingly varies little with the speed of rotation, at normal speeds.

But the motor starting torque, and consequently the running torque, can be modified by altering the setting angle $\alpha$ of rotor 4 with respect to rotor 1.

It may be noted that the motor torque would, for example, be zero (which would correspond to the motor stopped), if magnet 4 were set in a direction parallel to field H ($\alpha = 0$) and that its direction would be reversed, if magnet 4 were shifted through 180° ($\alpha = 270°$) with respect to its setting angular position giving maximum torque in the direction of motion, as shown by arrow 14. This adjustment would then correspond to reversed rotation at maximum speed.

Naturally, the motor torque MH $\sin \alpha$ can be given any value between the two maxima ($\pm$MH) by an adjustment, which may be continuous or not, of the inclination $\alpha$ of magnet 4 on field H.

This adjustment can be obtained by altering either the angular setting of transmitter stator 3 with respect to rotor 4, or preferably, the setting stator 2 with respect to rotor 1, since angular shifting of stator 3 on load might cause difficulties for high motor powers.

It is also possible to vary the angle α by introducing angular shift in the coupling 10 of rotor 1 to rotor 4.

In FIG. 2 the mechanical coupling 10 of rotor 4 with rotor 1 is substituted by a synchro-detection system. A mechanical coupling 101 is provided between rotor 4 and the permanent magnet of a first resolver 11 similar to that of FIG. 1. A coupling 102 couples to rotor 1 the permanent magnet rotor of a second resolver 12 similar to the former. The electrodes of the cosine probes of transmitter 11 are connected by a wire 13 to the electrodes of the cosine probes of synchro-detector 12 and the electrodes of the cosine probes of transmitter 11 are connected by wire 14 to the electrodes of the sine probes of synchro-detector 12.

Under these conditions, the control electrodes of the sine and cosine probes of device 12 deliver respective voltages, whose difference is proportional to the sine of the difference between the respective angular settings of the rotor magnets of resolvers 11 and 12. These two voltages are collected respectively at outputs 15 and 16 of synchro-detector 12 and are applied to a differential amplifier 17 whose output voltage, proportional to the sine of the angular difference which is to be cancelled, is applied to a control terminal of a motor 18.

The loop is closed by the mechanical coupling 19 which couples motor 18 to the rotor of synchro-detector 12.

Thus if the rotors of transmitter 11 and of synchro-detector 12 are not parallel, an error voltage appears at the output of differential amplifier 17 and causes motor 18 to rotate until the parallelism of the two rotors is obtained and the output voltage of amplifier 17 drops to zero, which stops motor 18.

A coupling between the rotors of resolvers 11 and 12 is thus obtained which provides an angle α, for example 90°, determined by the respective settings of rotor 11 with respect to rotor 4, and of rotor 12 with respect to rotor 1.

Such an arrangement may be useful when any contact between the Hall probes and an atmosphere, which may be detrimental to them but not to device 4, is to be avoided. FIG. 3 comprises the same angle repetition arrangement; it consists of a first transmitter resolver 11 and a second synchro-detector resolver 12 with a control loop between outputs 15 and 16 of resolver 12 and a mechanical coupling 19 driving rotor 12 through amplifier 17 and motor 18.

However, in addition, the transmitter rotor of this arrangement is controlled by a manual control knob 20 through a mechanical coupling 21, while rotor 12 is coupled by a mechanical coupling 22 to a pinion 23 which drives stator 2 through a toothed rim 24.

Knob 20 can also act directly on pinion 23; the synchro-detection system is then unnecessary.

It is clear that from an initial setting corresponding, for example to $α=π/2$, that is to say to the maximum value of the motor torque ($C_0=MH$), the arrangement just described permits rotating stator 2 by means of control knob 20, which can, for instance, be set against a graduation showing the corresponding values of α, from $-π/2$ to $+π/2$, or the corresponding speeds of the motor, in particular "forward" ($α=π/2$) and "reverse" ($α=3π/2$) to maximum torque, and the "stop" position ($α=0$).

Naturally, if there is no objection against the use of brushes and slip-rings, one may, without departing from the spirit of the invention, use a synchro-detection chain with conventional inductance-capacitance resolvers.

One may also, without departing from the spirit of the invention, insert a reduction gearing in coupling 10, for varying the angle α gradually as well as the motor speed. Consequently the motor will stop periodically when α is zero and at that instant each rotor will have completed a number of rotations determined by the reduction gear ratio. This may be useful in certain applications.

What is claimed is:

1. A motor for D.C. current comprising: a first stator; a first rotor rotatably mounted within said stator; a second stator; a second rotor rotatably mounted within said second stator; said first rotor comprising a permanent magnet with two magnetic pole pieces, said first stator comprising two Hall probes perpendicular to each other and having output electrodes for providing output voltages, respectively proportional to the sine and cosine of the angular position of said rotor; said second rotor comprising a permanent magnet and said second stator comprising two coils wound perpendicularly to each other; means for feeding to said two coils said output voltages of said output electrodes respectively; and means for maintaining a constant angular shift between the magnetic moments of said first and said second rotors.

2. A motor for D.C. current comprising: a first stator; a first rotor rotatably mounted within said stator; a second stator; a second rotor rotatably mounted within said second stator; said first rotor comprising a permanent magnet with two magnetic pole pieces, said first stator comprising two Hall probes perpendicular to each other and having output electrodes for providing output voltages, respectively proportional to the sine and cosine of the angular position of said rotor; said second rotor comprising a permanent magnet; and said second stator comprising two coils wound perpendicularly to each other; means for feeding to said two coils said output voltages of said Hall electrodes respectively; and a shaft carrying said rotors, the angular shift between said rotors being constant.

3. A motor for D.C. current comprising: a first stator; a first rotor rotatably mounted within said stator; a second stator; a second rotor rotatably mounted within said second stator; said first rotor comprising a permanent magnet with two magnetic pole pieces, said first stator comprising two Hall probes perpendicular to each other and having output electrodes for providing output voltages, respectively proportional to the sine and cosine of the angular position of said rotor; said second rotor comprising a permanent magnet; and said second stator comprising two coils wound perpendicularly to each other; means for feeding to said two coils said output voltages of said output electrodes respectively; an angle transmitting system having an input rotor coupled to said second rotor and an output rotor coupled to said first rotor and a servosystem for controlling said output rotor angular position by said input rotor angular position.

4. A motor for D.C. current comprising: a first stator; a first rotor rotatably mounted within said stator; a second stator; a second rotor rotatably mounted within said second stator; said first rotor comprising a permanent magnet with two magnetic pole pieces, said first stator comprising two Hall probes perpendicular to each other and having output electrodes for providing output voltages, respectively proportional to the sine and cosine of the angular position of said rotor; said second rotor comprising a permanent magnet; and said second stator comprising two coils wound perpendicularly to each other; means for feeding to said two coils said output voltages of said output electrodes respectively; and means for maintaining a constant angular shift between the magnetic moments of said first and said second rotors; means for adjusting angular shift of said first stator with respect to said second stator.

5. A motor for D.C. current comprising: a first stator; a first rotor rotatably mounted within said stator; a second stator; a second rotor rotatably mounted within said second stator; said first rotor comprising a permanent magnet with two magnetic pole pieces, said first stator comprising two Hall probes perpendicular to each other and having output electrodes for providing output voltages, respectively proportional to the sine and cosine of the angular position of said rotor; said second rotor comprising a permanent magnet; and said second stator comprising two coils wound perpendicularly to each other; means for feeding to said two coils said output voltages of said output electrodes respectively and means for maintaining a constant angular shift between the magnetic moments of said first and said second rotors; and an angle transmitting system having input rotor, means for controlling the angular position of said input rotor, an output rotor coupled to said first stator and a servosystem for controlling said output rotor angular position by said input rotor.

References Cited

UNITED STATES PATENTS

| 3,159,777 | 12/1964 | Manteuffel | 318—138 |
| 3,165,685 | 1/1965 | Manteuffel | 318—138 |
| 3,200,316 | 10/1965 | Engel | 318—138 |
| 3,210,631 | 10/1965 | Nicolls | 318—138 |

ORIS L. RADER, *Primary Examiner.*

G. SIMMONS, *Assistant Examiner.*